United States Patent

Gouck et al.

(10) Patent No.: US 9,593,020 B2
(45) Date of Patent: Mar. 14, 2017

(54) METHODS FOR CARBON DIOXIDE PURIFICATION

(71) Applicants: John Gouck, Kintnersville, PA (US); Michael Koch, Munich (DE)

(72) Inventors: John Gouck, Kintnersville, PA (US); Michael Koch, Munich (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/816,526

(22) Filed: Aug. 3, 2015

(65) Prior Publication Data

US 2017/0036918 A1    Feb. 9, 2017

(51) Int. Cl.
*C01B 31/20*    (2006.01)
*B01D 53/48*    (2006.01)
*B01D 53/72*    (2006.01)

(52) U.S. Cl.
CPC .............. *C01B 31/20* (2013.01); *B01D 53/48* (2013.01); *B01D 53/72* (2013.01)

(58) Field of Classification Search
CPC .......... C01B 31/20; B01D 53/48; B01D 53/72
USPC ....................................................... 423/437.1
See application file for complete search history.

(56) References Cited

U.S. PATENT DOCUMENTS

| 4,460,395 A * | 7/1984 | Nobles .................. F25J 3/0266 423/437.1 |
| 2003/0146310 A1* | 8/2003 | Jackson .................. A62D 3/19 239/690 |
| 2013/0251600 A1 | 9/2013 | Reddy et al. |

OTHER PUBLICATIONS

Search Report for GB1603984.4, dated: Sep. 9, 2016, 1 page.

* cited by examiner

*Primary Examiner* — Daniel C McCracken
(74) *Attorney, Agent, or Firm* — Joshua L. Cohen, Esq.

(57) ABSTRACT

A carbon dioxide gas stream is purified of contaminants by feeding it through a non-thermal plasma reactor. The contaminants are hydrocarbons and sulfur compounds which will be decomposed. The non-thermal plasma reactor may be part of an overall carbon dioxide purification process that uses a pre-purification step prior to further purification.

27 Claims, 1 Drawing Sheet

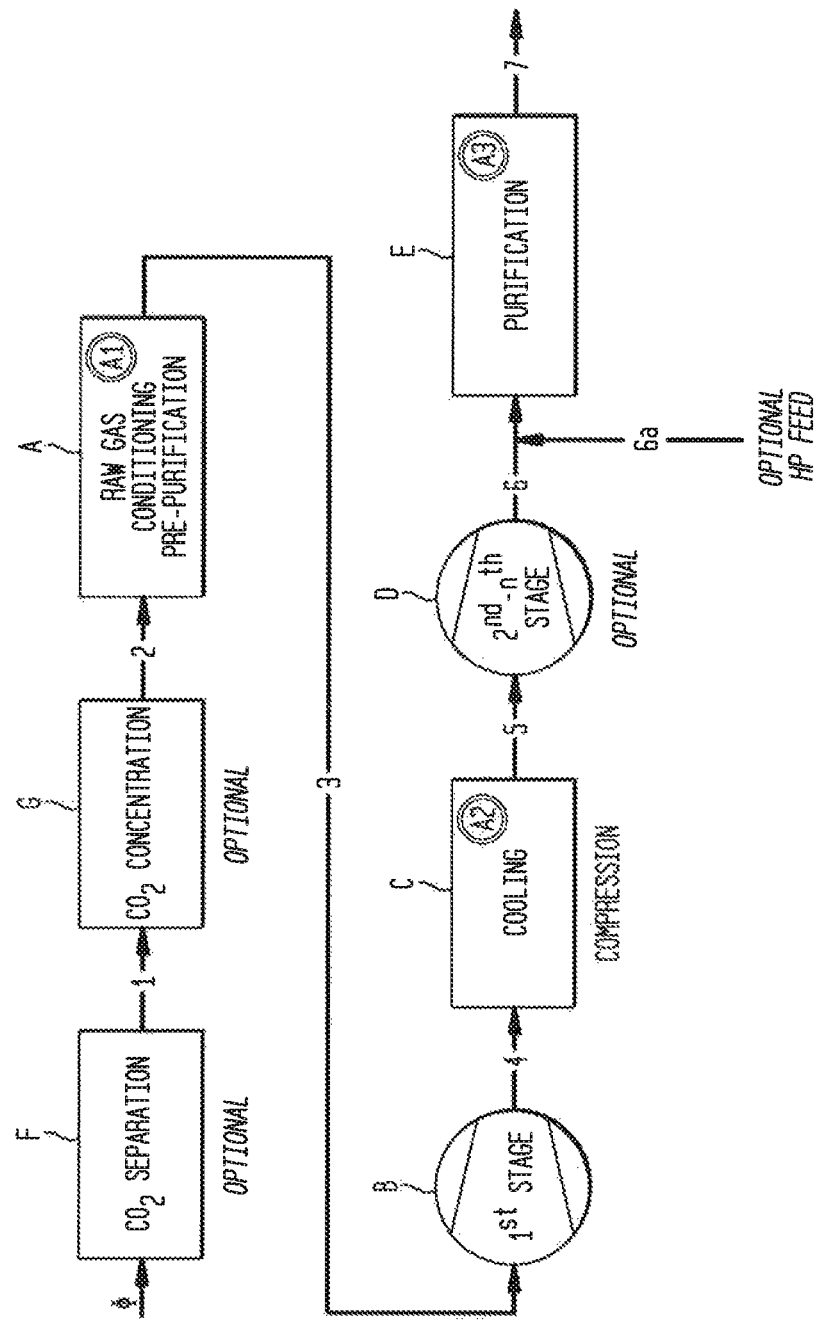

METHODS FOR CARBON DIOXIDE PURIFICATION

BACKGROUND OF THE INVENTION

The present invention relates to process for removing contaminants from gas streams in carbon dioxide production and purification processes.

During the operation of carbon dioxide purification plants, different sources of carbon dioxide are employed. These sources can vary widely in terms of the content of impurities present therein that need to be removed. This is particularly important in carbon dioxide that is to be beverage grade liquid carbon dioxide. Typically these contaminants include various hydrocarbons, non-condensable compounds and sulfur compounds. The carbon dioxide concentration in the feed of the stream to be purified will range between 10 and 99.9 volume %.

Typical technologies used to remove trace amounts of hydrocarbons and sulfur compounds (approximately <200 ppm in the feedgas) are adsorption and distillation. Absorption can also be utilized for water soluble hydrocarbons.

Higher concentrations of insoluble hydrocarbons are typically treated by catalytic oxidation. In these processes, oxygen is added to the feedgas and the carbon dioxide is preheated in a cross heat exchanger before entering a feedgas heater to reach the typical reactor inlet temperature of 450° C. The hydrocarbons are efficiently converted to carbon dioxide and water vapor in a reactor containing a noble metal catalyst. Heat is recovered in the cross heat exchanger and the product is cooled further in an aftercooler which can be a two stage system against cooling water and against refrigerant.

The hydrocarbon conversion is fairly efficient at an excess oxygen concentration at the outlet of greater than 500 ppm. However, methane conversion can be deficient and is usually addressed by a downstream distillation process. Further the cost for a catalytic oxidation unit can be expensive in terms of its installation. Because of the high temperatures and the water vapor present, high grade metallurgy is required in the heat exchangers and reactor vessel. Further the use of a palladium/platinum catalyst adds significant cost to the overall unit.

If the hydrocarbon content in the feedgas is sufficiently high such as greater than 2000 to 3000 ppmv hydrocarbon in the feedgas, the unit can operate autothermally, i.e., the heat recovered in the cross heat exchangers is sufficient to pre-heat the feedgas to the reactor inlet temperature and the feedgas heater is only required for start-up operation.

For lower hydrocarbon contents typically less than 2000 ppmv, the preheater needs to be in operation continuously which will add to the energy consumption for the process.

Historically, catalytic oxidation units were placed in plants which had a proven high hydrocarbon content in the feedgas thereby allowing for autothermal operation of the unit. A more recent development driven by the steadily increasing quality requirements for beverage grade liquid carbon dioxide product is to include catalytic oxidation unit in plants which have lower and/or uncertain hydrocarbon concentrations in the feedgas. This development leads to a safe design for plants to handle hydrocarbons in the feedgas but increases capital and operating costs of the plant significantly.

SUMMARY OF INVENTION

The invention provides for a method of removing contaminants from a carbon dioxide gas stream in a carbon dioxide purification plant.

The method provides for feeding a carbon dioxide gas stream containing the contaminants into a carbon dioxide purification facility. The carbon dioxide gas stream is passed through a non-thermal plasma unit which will fragment and/or oxidize hydrocarbon and sulfur compounds that are present as contaminants in the carbon dioxide gas stream.

In one embodiment of the invention, there is disclosed a method for removing contaminants from a carbon dioxide gas stream comprising feeding the carbon dioxide gas stream through a non-thermal plasma reactor.

Variations of this embodiment would include placing the non-thermal plasma reactor at different points in the $CO_2$ plant process and operating it at different pressures so that it is not only acting in a pre-purification capacity. This is further detailed with respect to the description of the FIGURE below.

The carbon dioxide gas stream after treatment can then be fed into a carbon dioxide purification facility.

Typically the contaminants that are removed from the carbon dioxide gas stream are selected from the group consisting of hydrocarbon compounds and sulfur compounds.

The hydrocarbon compounds are selected from the group of aliphatic hydrocarbons, aldehydes, alkanes, alkenes and alcohols.

The sulfur compounds are selected from the group consisting of sulfur dioxide, hydrogen sulfide, organosulfide compounds and carbonyl sulfide. The organosulfide compounds are typically mercaptans.

Typically the contaminants are present in the carbon dioxide gas stream in amounts ranging from about 10 ppmv to about 2000 ppmv.

The non-thermal plasma reactor is typically a dielectric barrier type plasma generator. These generators comprise a chamber where non-equilibrium plasma, i.e., where the bulk temperature is lower than the temperature of the generated plasma electrons, contacts the gas stream to be treated. This reactor can directly treat the gas or promote oxidation directly or via the use of a catalyst to remove the impurities.

The non-thermal plasma reactor is positioned at a location selected from the group consisting of in the raw gas conditioning unit, in the cooling and compression unit and in the purification unit.

The carbon dioxide gas stream contains 10 to 99.9 volume % carbon dioxide and is typically at ambient pressure.

In order to assist with the decomposition of the contaminants by the non-thermal plasma reactor, additional oxygen to stoichiometrically convert the contaminants to carbon dioxide and water vapor plus some excess may be fed into the carbon dioxide gas stream.

In another embodiment of the invention, there is disclosed a method for purifying a carbon dioxide gas stream containing contaminants comprising the steps of:
a) feeding the carbon dioxide gas stream into a raw gas conditioning unit;
b) feeding the carbon dioxide gas stream into a compression and cooling unit; and
c) feeding the carbon dioxide gas stream into a purification unit, wherein the carbon dioxide gas stream is fed into a non-thermal plasma reactor at a location selected from the group consisting of the raw gas conditioning unit, the cooling and compression unit and the purification unit.

The raw gas conditioning unit is typically a cooling unit and may be supplemented with an absorption and/or adsorption unit.

The compression and cooling unit is typically a screw compressor of oil-flooded type providing for cooling of the carbon dioxide with the compressor oil.

The purification unit is a gas treatment unit comprising an absorption and/or adsorption unit operations and followed by a liquefaction unit operation including distillation.

Optionally, the carbon dioxide gas stream is first fed to a carbon dioxide separation unit and a carbon dioxide concentration unit before it is fed into the raw gas conditioning unit.

The carbon dioxide gas stream may be fed to an optional second compressor after the cooling and compression unit. The optional second compressor may be a plurality of compressors. The compressor may alternatively be of oil-free screw type, reciprocating or centrifugal type, typically with inter- and aftercooling.

An additional feed of high pressure carbon dioxide may be fed to the carbon dioxide gas stream before entering the purification unit.

The invention further comprises placing a catalyst in the plasma reactor or downstream thereof.

The methods of the present invention will use less energy than a catalytic oxidation unit for a low to medium concentration of combustible impurities. Further by avoiding high temperatures in the process, a reduction in the cost for materials of construction and heat recovery equipment is also achieved. The small footprint of the non-thermal plasma unit allows for retrofitting at plants which is also economically more viable than retrofitting with a catalytic oxidation unit.

BRIEF DESCRIPTION OF THE DRAWINGS

The figure is a schematic of the pre-purification steps in a typical carbon dioxide purification facility.

DETAILED DESCRIPTION OF THE INVENTION

Turning to the figure, the purification steps of a carbon dioxide purification facility are shown with the possible placements for the plasma reactor. The carbon dioxide thus purified can be fed into the purification facility (the details of which are not shown) for further processing.

The plasma reactors labeled A1, A2 and A3 can be positioned at three different places in the purification process. It is envisioned that one or a combination of two or more plasma reactors could be employed in the method of the invention.

The raw carbon dioxide gas stream is fed first to a raw gas conditioning pre-purification unit A which contains the plasma reactor A1. This pre-purification unit A may contain molecular sieve materials which when employed in a pressure swing adsorption or temperature swing adsorption process can assist in removing contaminants from the carbon dioxide gas stream.

Optionally the carbon dioxide gas stream is fed through line 0 to a carbon dioxide separation unit F. The carbon dioxide separation unit F can typically be a membrane separation unit, an adsorption unit, or a typically regenerative absorption unit. The carbon dioxide gas stream so treated will be fed through line 1 to an optional carbon dioxide concentration unit G. The carbon dioxide concentration unit typically contains molecular sieve material for use in removing gaseous species from the carbon dioxide gas stream. The thus treated carbon dioxide gas stream is fed through line 2 to the raw gas conditioning pre-purification unit A.

The plasma reactor A1 operates at a pressure of about 0.5 to 1.5 Bara and will decompose the hydrocarbon compounds and sulfur compounds present in the carbon dioxide gas stream into carbon and hydrogen. The carbon dioxide gas stream so treated will be fed through line 3 to a first stage compressor B.

The use of a plasma reactor will break the C—H and C—C bonds present in the hydrocarbon compounds while leaving the carbon dioxide molecules largely unharmed. While some carbon dioxide decomposition can occur, this decomposition is limited by the energy input into the plasma reactor. The hydrogen or carbon can be removed from the carbon dioxide gas stream downstream by a scrubber assembly or other relevant gas separation unit. Typically in a catalytic oxidation process these materials would be destroyed outright.

The first stage compressor B will receive the carbon dioxide gas stream and will increase its pressure to around 5 to 8 Bar where the carbon dioxide gas stream will be fed through line 4 into a compression and cooling unit C.

The carbon dioxide gas stream will cool down in the compression and cooling unit C. The carbon dioxide gas stream may also be treated by plasma reactor A2 which by itself or in conjunction with plasma reactor A1 will cause decomposition of the hydrocarbons and sulfur compounds that may still be present in the carbon dioxide gas stream.

The thus treated carbon dioxide gas stream which will be lower in content of hydrocarbons and sulfur compounds will be fed to a second stage compressor D though line 5. This second stage compressor can actually represent a series of several compressors serially connected which can optionally be used to raise the pressure of the carbon dioxide gas stream. These one or more of several compressors can raise the pressure of the carbon dioxide gas stream to around 18 to 25 Bar.

This higher pressure carbon dioxide gas stream is fed from the second stage compressor D through line 6 to a purification unit E. The purification unit E will contain the third location for the plasma reactor, here designated as A3 and any hydrocarbons and/or sulfur compounds present in the carbon dioxide gas stream will be decomposed into hydrogen and carbon.

An optional high pressure feed of carbon dioxide can also be employed feeding the carbon dioxide into line 6 through optional feed line 6a. This additional stream of carbon dioxide would consequently be treated by the plasma reactor A3 as per its treatment of the higher pressure stream of carbon dioxide gas stream.

The carbon dioxide that is thus treated by the plasma reactor A3 in purification unit E is then fed through line 7 into the remainder of the carbon dioxide purification process (not shown).

An optional feature associated with the plasma reactor is the use of a catalyst. This catalyst can be either present in the plasma reactor or downstream thereof and will facilitate the destruction of radicals that are generated by the plasma reactor.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for removing contaminants from a carbon dioxide gas stream at ambient pressure comprising feeding the carbon dioxide gas stream through a non-thermal plasma reactor.

2. The method as claimed in claim 1 wherein the carbon dioxide gas stream is fed into a carbon dioxide purification facility.

3. The method as claimed in claim 1 wherein the contaminants are selected from the group consisting of hydrocarbon compounds and sulfur compounds.

4. The method as claimed in claim 3 wherein the hydrocarbon compounds are selected from the group consisting of aliphatic hydrocarbons, aldehydes, alkanes, alkenes and alcohols.

5. The method as claimed in claim 3 wherein the sulfur compounds are selected from the group consisting of sulfur dioxide, hydrogen sulfide, organosulfide compounds and carbonyl sulfide.

6. The method as claimed in claim 5 wherein the organosulfide compounds are mercaptans.

7. The method as claimed in claim 1 wherein the non-thermal plasma reactor is a dielectric barrier plasma generator.

8. The method as claimed in claim 1 wherein the carbon dioxide gas stream contains 10 to 99.9 volume % carbon dioxide.

9. The method as claimed in claim 1 further comprising feeding oxygen into the carbon dioxide gas stream.

10. A method for purifying a carbon dioxide gas stream at ambient pressure containing contaminants comprising the steps of:
   a) feeding the carbon dioxide gas stream into a raw gas conditioning unit;
   b) feeding the carbon dioxide gas stream into a compressor;
   c) feeding the carbon dioxide gas stream into a compression and cooling unit; and
   d) feeding the carbon dioxide gas stream into a purification unit, wherein the carbon dioxide gas stream is fed into a non-thermal plasma reactor at a location selected from the group consisting of the raw gas conditioning unit, the cooling and compression unit and the purification unit.

11. The method as claimed in claim 10 wherein the contaminants are selected from the group consisting of hydrocarbon compounds and sulfur compounds.

12. The method as claimed in claim 11 wherein the hydrocarbon compounds are selected from the group consisting of aliphatic hydrocarbons, aldehydes, alkanes, alkenes and alcohols.

13. The method as claimed in claim 11 wherein the sulfur compounds are selected from the group consisting of sulfur dioxide, hydrogen sulfide, organosulfide compounds and carbonyl sulfide.

14. The method as claimed in claim 13 wherein the organosulfide compounds are mercaptans.

15. The method as claimed in claim 10 wherein the non-thermal plasma reactor is a dielectric barrier plasma generator.

16. The method as claimed in claim 10 wherein the carbon dioxide gas stream contains 10 to 99.9 volume % carbon dioxide.

17. The method as claimed in claim 10 further comprising feeding oxygen into the carbon dioxide gas stream.

18. The method as claimed in claim 10 further comprising feeding the carbon dioxide gas stream to a carbon dioxide separation unit and a carbon dioxide concentration unit before step (a).

19. The method as claimed in claim 10 further comprising feeding the carbon dioxide gas stream to an optional second compressor after the feeding to the compression and cooling unit.

20. The method as claimed in claim 19 wherein the optional second compressor is a plurality of compressors.

21. The method as claimed in claim 19 further comprising feeding additional high pressure carbon dioxide to the carbon dioxide gas stream before the feeding the carbon dioxide gas stream into the purification unit.

22. The method as claimed in claim 10 wherein the raw gas conditioning unit is selected from the group consisting of an absorption unit, an adsorption unit, and both an absorption unit and an adsorption unit.

23. The method as claimed in claim 10 wherein the purification unit is a gas treatment unit comprising an operation selected from the group consisting of an absorption unit, an adsorption unit and both an absorption unit and an adsorption unit, and a liquefaction unit.

24. The method as claimed in claim 23 wherein the liquefaction unit is a distillation unit.

25. The method as claimed in claim 10 wherein the compression and cooling unit is an oil-flooded screw compressor.

26. The method as claimed in claim 10 further comprising placing a catalyst in the plasma reactor.

27. The method as claimed in claim 10 further comprising placing a catalyst downstream of the plasma reaction.

* * * * *